United States Patent [19]

Van Eenam

[11] 4,346,027

[45] Aug. 24, 1982

[54] AIR-DRYING COMPOSITIONS FOR TREATING FIBROUS SUBSTRATES

[75] Inventor: Donald N. Van Eenam, Des Peres, Mo.

[73] Assignee: Monsanto Company, St. Louis, Mo.

[21] Appl. No.: 188,642

[22] Filed: Sep. 19, 1980

[51] Int. Cl.$^3$ .............................................. C08K 5/15
[52] U.S. Cl. .................................. 524/377; 524/386; 524/387; 524/547; 524/548; 524/559; 524/543
[58] Field of Search ............... 260/33.2 R, 33.4 R, 260/33.4 EP, 33.4 PQ

[56] References Cited

U.S. PATENT DOCUMENTS

| | | | |
|---|---|---|---|
| 2,413,860 | 1/1947 | Brookes | 260/33.2 R |
| 3,196,120 | 7/1965 | McLaughlin et al. | 260/33.4 EP |
| 3,284,385 | 11/1966 | D'Alelio | 260/33.2 R |
| 4,145,248 | 3/1979 | Eenam | 162/168 R |

*Primary Examiner*—Joseph L. Schofer
*Assistant Examiner*—N. Sarofim
*Attorney, Agent, or Firm*—David Bennett; William J. Farrington; Edward P. Grattan

[57] ABSTRACT

Polymer compositions are described that confer an enhanced balance of wet and dry strength properties to a cellulosic substrate while leaving the substrate soft and porous. The compositions comprise a hydrophilic air-curing polymer and a polyol with a carbon to oxygen ratio of less than 3:1, typified by glycerol.

10 Claims, No Drawings

AIR-DRYING COMPOSITIONS FOR TREATING FIBROUS SUBSTRATES

BACKGROUND OF THE INVENTION

This invention relates to polymer compositions of the type adapted to be applied to fibrous substrates so as to improve their physical properties, notably the wet and dry strength of paper substrates.

The invention particularly relates to polymer compositions that are capable of curing by an air-drying mechanism and which are, by virtue of their predominantly hydrophilic character, suitable for application to cellulosic substrates, such as paper, in the form of an aqueous solution or emulsion.

The polymer compositions of the invention therefore are extremely useful as additives in the production of paper products where strength, absorbency, lightness and texture are important. It is not generally fully acceptable for most purposes if a paper product is very strong when dry but easily pulled apart when wet. A good balance of wet and dry strength is required. To obtain this good balance it is essential that the polymer before it is cured be dispersed in the paper web in such a way that it is capable of bonding a substantial number of the tangled fibers at the critical cross-over points where the fibers touch. This can be done by application of large amounts of the polymer, which may be uneconomic and could, especially if the polymer is essentially hydrophobic, affect adversely other desirable characteristics such as absorbency, handle, flexibility, softness and the like.

Alternatively a polymer can be used that is essentially hydrophilic such that it can be added as an aqueous solution or emulsion and will transport readily along the fibers and concentrate at the cross-over points before cross-linking. It is this form of polymer that is obviously the more efficient in developing wet strength.

DISCUSSION OF THE PRIOR ART

The wet strength of paper products has been improved by a wide range of additives relying on the formulation of cross-links either by reaction of epoxide groups or by traditional formaldehyde-containing polymer chemistry. Such products however are not very suitable for application in a dry end operation particularly where the substrate is a dry laid web. As a result the preferred manner of improving coherence in such a product is by spraying on a latex and spot bonding, for example by a thermolysis operation. The product obtained thereby does not however usually have good wet strength and may be deficient in other properties such as absorbency and handle.

A polymer that is capable of giving excellent wet strength to such a product is an air-curing polymer such as is described in U.S. Pat. No. 4,145,248 or a polymer obtained from a monomer containing at least two activated unsaturations by the process described in U.S. application Ser. No. 150,789. Both of these polymers are hydrophilic in character and are readily transported along the paper fibers to cross-over points where they dry by an air-curing mechanism. These polymers may be added alone or in combination with a latex as described in U.S. application Ser. No. 150,790.

It has been found however that the critical parameter for many applications is the ratio of wet strength to dry strength which should most preferably be at least 0.5. In fact such ratios are not readily achieved by the prior art processes and thus the full advantage of the novel strength that air-drying polymers represents is not realized.

While the preferred air-curing polymers are highly hydrophilic some that are otherwise very useful are found to be of only borderline hydrophilic character such that, on application to a cellulosic substrate, the treated substrate may have somewhat reduced porosity or absorbency and hence reduced utility for some purposes. It has now been found that such polymers can be modified by the use of a certain type of additive such that the overall composition is greatly increased in hydrophilicity and the utility of the polymer as a wet/dry strength additive is greatly enhanced.

It has also been found that ratios of wet to dry strength comfortably in excess of 0.5 can be attained by the use of the same modifying additive with the polymers disclosed in the above described art. In addition these additives can convey other advantageous properties such as viscosity depression, flow-control, over-oxidation suppression and softening of the treated substrate.

DESCRIPTION OF THE INVENTION

This invention comprises a composition for improving the properties of a cellulosic fibrous substrate which comprises an air-curing polymer and a polyol having at least two —OR groups where R is —H or —CH$_3$ provided at least one R is hydrogen, and a carbon to oxygen atom ratio of less than 3.0:1.

By the term "hydrophilic air-curing polymer"0 is indicated a polymer that is capable of cross-linking on exposure to oxygen, especially in the presence of a transition metal drier salt, and which retains a hydrophilic character.

A suitable measure of the hydrophilic character of the polymer is its "water wicking time" and this may be determined by applying the polymers in the form of an aqueous solution or dispersion to Whatman #1 filter paper at a 10 percent weight/weight ratio, drying the paper at 120° C. for 10 minutes in a circulating air oven and then dropping onto the center of the horizontally positioned paper, a 0.10 ml. drop of water at 22° C. and measuring the time for the drop to disappear. The end point is determined by the disappearance of the gloss indicating that no water film remains on the surface. The speed with which this occurs is a function of the speed with which the water is dissipated through the paper fibers by the wicking effort and this in turn is controlled by the hydrophilicity of the fibers. If therefore a cellulosic paper substrate (which is naturally very hydrophilic) is treated with a hydrophobic composition, the water will tend to "bead" rather than be absorbed and spread through the paper; and consequently the "water wicking time" will be high. Thus, the water wicking time is a very effective technique for assessing the hydrophilicity of a composition by a practical and easily performed test. Generally a water wicking time of 30 seconds or less is indicative of good hydrophilic character but the composition of the invention allows the use of much less hydrophilic polymers which alone would have a water wicking time of as high as 100 seconds because the polyol increases the absorbency of the treated substrate to a most remarkable degree. It is intended therefore that such polymers also be embraced by the term "hydrophilic air-curing polymer."

Typical and highly preferred hydrophilic air-curing polymers are those described in U.S. Pat. No. 4,145,248 and U.S. application Ser. No. 150,789 (which are wholly incorporated herein by reference) as well as blends of such polymers.

The composition of the invention has particular utility when it also comprises a latex as described in U.S. application Ser. No. 121,849 (incorporated herein by reference) to improve also the dry strength of the substrate.

THE POLYOL ADDITIVE

The polyol additive is a compound of carbon, hydrogen and oxygen containing at least two —OR groups, where R is —H or —CH$_3$ provided that at least one, and preferably all, are hydrogen and having a carbon to oxygen atomic ratio of less than 3.0:1. The additives may in addition comprise ether linkages as for example are formed in polyoxyalkylene derivatives. Typical polyol additives include ethylene glycol; propylene glycol; 1,3-butanediol ; 1,4-butanediol; glycerol; 1,2,4-butanetriol; sorbitol; diethylene glycol; triethylene glycol; polyethylene glycol; methoxypolyethylene glycol; sorbitol/ethylene oxide condensates; polyglycerol; polypropylene glycol; 1,2,6-hexanetriol; polyglycidol; and polyoxyethylene mannitol.

The amount of such polyol additive to be used can be from 1 to 50% by weight of the composition and preferably from 1 to 20%.

Many of the above polyol additives also have the function of humectants and depending on the end-use this may or may not be a desirable feature influencing the level of addition employed.

The most preferred polyol additives are those that are liquid and readily dispersed in the hydrophilic air-curing polymer solution or emulsion. For this reason the additives should most preferably have a melting point of less than 50° C. and this implies that the higher molecular weight polyol condensates are not generally favored. It is also found that while the high molecular weight products have an advantageous effect on the hydrophilicity of the treated substrate, (and hence its readiness to absorb water), they show little or no advantage in adjusting the wet/dry strength ratio.

The preferred polyol additives has a carbon/oxygen atomic ratio of less than 1.5:1 and is a liquid at room temperature. Thus the preferred polyols include glycerol, sorbitol, 1,2,4-butanetriol and triethylene glycol.

THE AIR-CURING POLYMER COMPONENT

The air-curing polymers that are particularly preferred have a backbone comprising at least one segment with the formula:

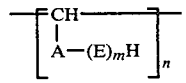

wherein A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either α, β or βγ to the activating group, n is the number of adjacent (as the term is hereinafter defined) segments having this formula, and n and m are integers and are each at least 1, provided that where one is less than 4 the other is at least 4. These polymers are generally referred to, for the sake of brevity as polyetherenes.

The polyether-enes can have a plurality of adjacent segments of the above formula and by "adjacent" is meant that they are directly connected through a carbon-carbon bond or are indirectly connected through a

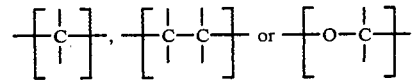

group or an oxygen or sulfur atom.

The effectiveness of the polyetherenes depends to a large extent on the provision of a plurality of activated double bonds in blocks which are spatially closely related. These double bonds are sites at which oxygen-initiated crosslinking takes place during the drying or accelerated or natural aging operation. Thus, the provision of blocks of activated double bonds each of which can provide a bond site, increases the potential crosslink density as well as the structural strength of the crosslinks that form both inter- and intra-molecularly during drying and/or aging.

The double bonds are activated, by which is meant that by virtue of their proximity in the polymer molecule to other strongly electron-donating groups they are more ready to form crosslinks during the air drying process. Examples of such electron-donating groups include ether, sulfide, hydroxyl, carboxyl, and olefinically unsaturated groups. The preferred electron-donating group is an ether group.

There are, therefore, two basic structural types of polyether-ene resins embraced by the formulation above. The first type comprises a backbone molecule with as little as two active hydrogen-containing groups which is reacted with a compound containing an epoxy group and an activated terminal double bond in proportions such that there are at least four and preferably from 4 to 10 or even 20 epoxy groups per active hydrogen-containing group. As a simple example the polymer obtained by reacting 1 mole of glycol with 8 moles of allyl glycidyl ether produces a polymer having the average structure

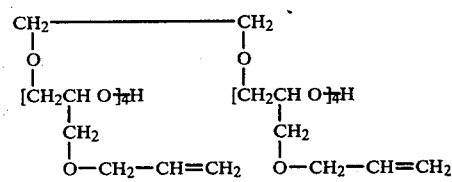

thus providing two blocks of four adjacent allylic groups, assuming, of course, uniform addition at both sides. In this compound the moiety A in formula (I) is —O— and the moiety E is

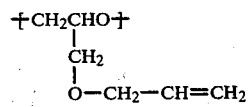

and has the double bond β, γ to the activating oxygen group. This type of polymer is highly preferred in the present invention.

The other type of structure is obtained for example, when a backbone molecule which comprises at least four adjacent active hydrogen-containing groups is reacted with an unsaturated epoxy compound as described above or alternatively, using Williamson's ether synthesis, with allyl chloride to produce a block of pendant allylic groups. In this case the ether oxygen provides the activation for the double bond in the allyl group and also the group "A". An example of such a product is that produced by the reaction of allyl chloride with polyglycidol to produce a polymer having structure with repeating units of the formula:

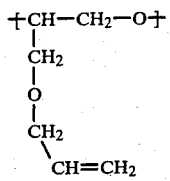

Here the moiety A in formula (I) is $-\!\!\!+\!\!CH_2O\!\!+\!\!\!-$, the moiety E is $-CH_2-CH=CH-$ and m is 1 and n is at least 4, the olefinic unsaturation is β, γ to the activating oxygen.

The backbone compound can therefore be a polymeric polyol such as polyethylene glycol, polyglycerol, polyglycidol, polyvinyl alcohol, a partially hydrolyzed polyvinyl acetate, a styrene/allyl alcohol copolymer, poly (2-hydroxyethyl acrylate), poly(vinyloxyethanol), a monomeric polyol such as sorbitol, mannitol, or ethylene glycol; a monomeric alcohol such as allyl alcohol, the corresponding thiols; and dicarboxylic acids such as fumaric acid, maleic acid, malonic acid and phthalic acid. Also, compounds containing a mixture of radicals can be used such as hydroxy acids, which are compounds containing the carboxyl and hydroxyl radicals, hydroxy amides, hydroxy ethers, hydroxy esters, and the like. However, polyhydric alcohols having from 2 to 6 carbon atoms are preferred and sorbitol is especially preferred.

The epoxy compound reacted with the backbone compound comprises an epoxide group and an activated double bond.

The epoxy compounds that can be used have the general formula $$R_1-\overset{O}{\overset{\diagup\hspace{-0.5em}\diagdown}{CH-CH}}-[M]-CH=CH=R_2$$

wherein M is absent or is a group capable of activating the double bond such as, for example, the following $$-CH_2-CH=CH-,$$

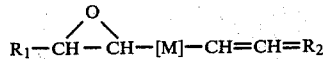

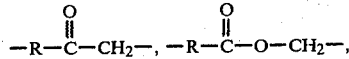

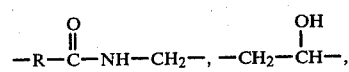

$-CH_2-O-$, $-CH_2-S-$, $-CH_2-O-CH_2-$, and $-CH_2-S-CH_2-$, wherein R is a $C_1$ to $C_4$ alkylene group and $R_1$ and $R_2$ are each hydrogen or $C_1$ to $C_4$ alkyl groups. The corresponding episulfides may also be used.

It is important that the activating group does not comprise a moiety that will inhibit or deactivate the air-curing reaction chemistry. Such disfavored groups include free primary and secondary amine, phenolic hydroxyl and aldehyde groups.

Preferred compounds include allyl glycidyl ether, sorbyl glycidyl ether, butadiene monoxide and vinyl cyclohexene monoxide. The most preferred reactant which is also readily available at relatively low cost is allyl glycidyl ether.

Other preferred hydrophilic air-curing polymer compositions that can be used in the present invention are those obtained by passing oxygen through a monomer maintained at a temperature of 30° C. or below, said monomer having a structure comprising at least two unsaturations, with no more than three of said unsaturations being adjacent in the molecule, at least one of said unsaturations being α, β or β, γ to a nucleophilic group capable of activating the unsaturation towards oxidative polymerization and selected from the group consisting of $-O-$, $-S-$, $-CON<$, $-COO-$, $>C=C<$, $SO.OH<$, $-SO.O-$, and $>NCN$, so as to polymerize the monomer oxidatively and raise the viscosity of the system to a desired level. The polymers obtained are referred to as hydrophilic oxidative polymers.

The monomer used comprises at least two activated unsaturations. As incidated above, each unsaturation is activated towards oxidative polymerization by a group that is generally nucleophilic in nature and therefore strongly electron-donating. The activating group is usually the residue of an active hydrogen-containing moiety with an active hydrogen removed to allow bonding to the group containing the unsaturation.

The group consisting the activated unsaturation is usually a substituted or unsubstituted vinyl, or more preferably an allyl radical. It can, however, be a homolog of such groups. It is often useful to have the unsaturation that is α, β or β, γ to the activating group conjugated with another unsaturated group in the same chain. It should be recalled, however, that as the length of a hydrocarbon chain increases, the hydrophilicity of the overall monomer decreases.

Typical unsaturated groups include, for example: $-CH_2CH=CH_2$, $-CH=CH_2$, $-C(CH_3)=CH_2$, $-CH=CHCH=CH-$ ("cis" and "trans" versions), $-CH_2-CH=C<$, $-CH_2C(CH_3)=CH_2$, and $-CH(CH_3)CH=CH_2$. Since the monomer comprises at least two or three such groups it is convenient to refer to them as di/tri olefinic monomers.

Preferred among the activating groups described above are $-COO-$, $-O-$, $-S-$, $-CON<$, $>N.CN$ or an unsaturated group in which the unsaturated bond is conjugated with the activated unsaturation. Of course the same group can be used to "activate" several unsaturated bonds as for example in diallyl ether. The most effective activating groups are the ones that are most strongly electron donating (nucleophilic) such that the affected carbon-to-carbon unsaturations are most intensely "activated" toward air-curing chemistry.

No more than three of the activated unsaturation-containing groups may be adjacent to one another, that is to say, pendant from carbon atoms in a common backbone molecule which atoms are directly linked or separated by one or two other carbon atoms, an oxymethylene group or an oxygen or sulfur atom.

The molecule need not contain only the groups and moieties indicated. Other non-interfering functional or non-functional groups such as ester, amide, nitrile, carboxylic acid, ketone, carboxyaldehyde, sulfonamide, and the like can be present in the molecule. Indeed, sometimes functional groups can be very significant in providing a monomer that will result in a polymer with an appropriate degree of hydrophilicity, polarity, and substantivity.

Very often, however, the preferred molecules are as simple as possible since these tend also to be relatively cheap. An excellent monomer starting material is 1,2 diallyloxy-ethane. Other possible monomers include, 1,4-diallyloxy-2-butene, 1,3-diallyloxy-2-propanol, diallyl sulfide, $\beta$-vinyloxy ethyl allyl ether, diallyl succinate, diallyl maleate, diallyl fumarate, triallyl cyanurate, triallyl isocyanurate, triallyl orthoformate, dimethallyl malonate and bis($\beta$-vinyloxyethyl)ether.

A useful predictive tool for determining which unsaturated monomers are capable of undergoing oxidative polymerization is the monomer's "Q value" as described by Alfrey and Price in J. Polymer Science, Vol. 2, p. 101, (1947). Q represents the reactivity of the monomer and the lower the Q value, the more readily will the monomer undergo oxidative polymerization. In general monomers suitable for oxidative polymerization by the process described have Q values below 0.3 and preferably below 0.1. Examples of suitable monomers with their corresponding Q values are (o-, m- or p-) diallyl phthalate, 0.044; dimethallyl oxalate, 0.038; and triallyl-isocyanurate, 0.011.

Some of the polymers themselves are of marginal or even poor hydrophilicity as the term is herein used. However the incorporation of a surface active agent into the polymer composition will usually reduce the water wicking time to a level that is within the limit set for the term "hydrophilicity".

The oxidative polymerization process is carried out at temperatures of 30° C. or lower and preferably at from 10° C. to 25° C. and can involve the monomer alone, (which will conventionally be a liquid under normal conditions) or a solution or emulsion of the monomer in a solvent.

The temperature of the reaction is found to be critical in that low temperatures are required if reactive peroxy and hydroperoxy sites that are applicable to air-curing chemistry are to be obtained and accumulated in adequate numbers. It is surprisingly found, for example, that reaction at a high temperature (above 30° C. and typically at 60°-70° C. or even higher) produces a polymer that, when applied to paper, generates good dry strength but poor wet strength, indicating inadequate cross-linking of the polymer on air-curing. By contrast, the wet strength generated by hydrophilic oxidative polymers is very substantially better, indicating that a much higher degree of cross-linking has been achieved.

It is known that polyether-enes can be enhanced in their activity by subjecting them to an air building process in which air is bubbled through the polymer until a desired viscosity is reached, most desirably at a temperature below about 30° C. Such polymers are referred to as "activated" polyether-enes.

It is also known that polyether-enes can be post-mixed with hydrophilic oxidative polymers or their monomeric precursors either in the unmodified polyermic form or in the activated form prior to oxidative polymerization.

All of these variations can be used as the air-curing polymer component of the present invention.

The air-curing chemistry can be much accelerated by the presence of traces of heavy metal salts including for example, cobalt acetate, cobalt octoate, manganese acetate and other organio salts of transition metals known to be capable of functioning as "metalic driers" in the paint field. Organic peroxides such as benzoyl peroxide and similar hydroperoxides are also found to be effective either alone or in conjunction with the metallic driers described above. The incorporation of from 0.001 to 0.1% by weight of such a salt to the fibrous substrate, along with the polymer is a preferred feature of the present invention.

LATEX BLENDS

The polymer compositions of the invention can most advantageously comprise, in addition to the air-curing polymer component and the polyol, a latex of a thermoplastic polymer.

It is preferred that the latex polymer be a homopolymer or a copolymer of an unsaturated ester monomer such as a vinyl or allyl ester or an acrylate ester. Specific examples of suitable thermoplastic polymers that can provide the latex include: polyvinyl acetate, ethylene/vinyl acetate copolymers, ethylene/vinyl chloride copolymers, polyvinyl chloride and various acrylic polymers commercially available as latices.

It is of course necessary that the polymer is not such as would interfere with the air-curing polymer activity. This is the case, for example, with highly reactive polymers such as the ethyleneimines, polymers containing an N-methylamino functionality as well as other compounds which act as free radical inhibitors, stabilizers, antioxidants and the like.

The preferred polymer latices for use with the compositions of the invention are those that can undergo thermolysis reactions and subsequent crosslinking. This, in fact, is how some polymer latices that can be added to air laid webs generate an increase in wet as well as dry strength. Thus the preferred polymer is one which undergoes thermolysis below about 200° C. and more preferably 160°-165° C. so that the underlying substrate is not damaged. Such polymers are generally film-forming thermoplastic polymers and copolymers that comprise groups that can easily be split off in a thermolysis reaction.

Less preferred polymers are those that contain a plurality of unsaturations and are capable of undergoing a curing operation while in place on a substrate. As an example both liquid polybutadiene emulsions and particulate solid latices are capable of undergoing an air-curing type cross-linking operation and it is found that these are aided by the presence of the air-curing polymer of Component B. However such polymers often tend to be hydrophobic so that relatively large amounts of an additive imparting hydrophilic properties are necessary to give the overall composition of water-wicking time in the prescribed range.

The latex is generally stabilized by a surfactant system that may or may not be identical to any emulsion stabilizer used in connection with the air-curing polymer. The amount of each surfactant component, as well as the total surfactant level, will depend greatly on both latex and emulsion properties and structures. Each resin has its own emulsifier need and either an excess or a deficiency can lead to a break in the stability of either. In general, however, from 1 to 3 percent by weight of the surfactant may be required. If a surfactant is used it should preferably be of the anionic or non-ionic variety so as to avoid destabilizing interactions. The use of protective colloids such as polyvinyl alcohol, carboxy methyl cellulose, hydroxyethyl cellulose and the like may often be very advantageous as aqueous viscosifiers for the aqueous phase as well as for sterically stabilizing the emulsion of the air-curing polymer.

Thus the compositions of the invention comprise a polyol additive blended with: A. an air-curing polymer; B. an activated air-curing polymer; C, A or B in the presence of a metallic drier; D. a hydrophilic oxidative polymer; E. D in the presence of any one or more of A, B and C; F. one or more of A, B, C, D and E in the presence of a thermoplastic latex.

APPLICATION OF COMPOSITIONS

The compositions of the invention can be applied conveniently as a wash or as a spray in a highly concentrated form (about 50% solids or even higher) or a more dilute solution or emulsion, (about 5 or 10% solids). The invention finds its greatest utility when applied to debonded paper webs where its hydrophilic character and the ready transport of the composition along the fibers of the web are most useful.

The composition can be applied above or with any other additive such as a dye, plasticizer, stabilizer and the like, providing the additive does not interfere with the air-curing chemistry that makes the composition particularly effective.

DESCRIPTION OF THE PREFERRED EMBODIMENTS

The invention is further described with reference to the following examples which are for the purposes of illutration only and are intended to imply no limitation on the essential scope of the invention.

Test Procedures

In the following examples, the performance of the various formulations was assessed using the following procedures.

Application and Sample Preparation

The samples for evaluation were based on Whatman #1 12.5 cm diameter filter paper circles which were sprayed with a fine mist of the treating solution or emulsion until a desired solids level has been deposited on the sheet. Both sides were sprayed equally.

Dry/cure was accomplished by heating at 120° C. for 10 minutes in a circulating air oven.

Tensile Strength

One inch (2.54 cm) test strips were cut from the circles in the machine direction and used to evaluate the tensile strength on an Instron Tensile Tester.

Dry strength was tested on the strips directly and wet strength on strips that had been soaked in water containing 0.1% by weight of a detergent for 10 minutes, rinsed with water and then lightly padded with blotting paper to remove excess surface moisture.

Hydrophilicity

A suitable measure of the hydrophilic character of the polymer is its "water wicking time" and this may be determined by applying the polymer in the form of an aqueous solution or dispersion to Whatman #1 filter paper at a 10 percent weight/weight ratio, drying the paper at 120° C. for 10 minutes in a circulating air oven and then dropping onto the center of the horizontally positioned paper, a 0.10 ml. drop of water at 22° C. and measuring the time for the drop to disappear. The end point is determined by the disappearance of the gloss indicating that no water film remains on the surface. The speed with which this occurs is a function of the speed with which the water is dissipated through the paper fibers by the wicking effort and thus in turn is controlled by the hydrophilicity of the fibers. If therefore a cellulosic paper substrate (which is naturally very hydrophilic) is treated with a hydrophobic composition, the water will tend initially to "bead" rather than be absorbed and spread through the paper; and consequently the "water wicking time" will be high. Thus, the water wicking time is a very effective technique for assessing the hydrophilicity of a composition by a practical and easily performed test. Generally a water wicking time of 30 seconds or less is indicative of good hydrophilic character but because of the effect of the polyol, polymers with times up to 100 seconds have sufficient hydrophilicity.

EXAMPLE I

Preparation of Air-Curing Polymer

This describes the production of a hydrophilic air-curing polymer of the type described in U.S. Pat. No. 4,145,248.

A four liter four-necked round-bottomed flask equipped with a stirrer, thermometer, condenser and addition funnel was charged with 43.45 g (0.70 mol) of ethylene glycol and 1.0 g of boron trifluoride in ether.

The reaction mixture was blanketed in nitrogen and the addition of 799 g (7.0 mole) of allyl glycidyl ether was begun. The addition took place over six hours at a temperature of 77°–79° C. After addition of 200, 400 and 600 ml of the allyl glycidyl ether the addition was stopped, the temperature was reduced to about 20° C., and a further 0.5 g of the boron trifluoride catalyst was added dropwise with stirring. Upon completion of each catalyst addition the reaction temperature was again raised to 77°–79° C. and the addition of allyl glycidyl ether was resumed.

When the addition had been completed the reaction mixture was stirred for a further 30 minutes at 80° C. before being allowed to cool to room temperature.

The mixture was then triturated with 50 ml. of saturated potassium carbonate solution to neutralize the residual catalyst and then taken up in ether. This solution was washed with saturated sodium sulfate solution until neutral and then dried over anhydrous sodium sulfate.

After filtration and removal of the ether solvent 842.5 g of the air-curing polymer were obtained representing a 99.7 percent yield based on the theoretical yield. The polymer was in the form of an essentially colorless, slight/moderate viscosity oil.

EXAMPLE 2

This example illustrates the effectiveness of the polyol in adjusting the properties of polyether-ene treated paper substrate.

A Waring blender was charged with 12.5 g of the polyether-ene prepared in Example 1 (Gardner Viscosity-F); 0.2 g of a sodium alkylbenzene sulfonate anionic surfactant in the form of a 40% active aqueous slurry; 0.40 g of Triton X-305, (a non-ionic surfactant available under that trade designation from Rohm & Haas Co.), 0.63 g of a 5.0% aqueous solution of cobaltous acetate tetrahydrate; and 36.27 g of deionized water. The mixture had a 25% actives content and after emulsification for 3 minutes at 25°–30° C. it was transferred to a stirred vessel and 50 g of a 25% actives polyvinyl acetate latex were added slowly in dropwise fashion.

This composition formed the "Control".

To 50 g of the "Control" composition were added, dropwise, 3.75 g of glycerol. This represents the composition of the "Invention".

Both "Invention" and "Control" compositions were used to treat filter paper at an application level of 200 kg/metric ton of substrate paper. The results, which were compared with a sheet given a pure water spray are reported in Table 1 below.

TABLE 1

| TREATED PAPER PROPERTIES | | | |
|---|---|---|---|
| | Tensile Strength gm/cm | | Water Wicking Time |
| | Wet | Dry | Wet/Dry Ratio | (sec.)softeness |
| Control | 3126 | 6394 | 0.489 | 17 sl. harsh |
| Invention | 3501 | 5483 | 0.638 | 2 very soft |
| Water only | 71.4 | 2000 | 0.036 | 1+ smooth |

EXAMPLE 3

This example illustrates the effectiveness of the polyols of the invention by comparison with other related plasticizer materials.

The base for the comparison was a 25% actives emulsion of air-curing polymer prepared in Example 1. Samples of this formulation were treated with the additive specified in the amount indicated and the effect on water wicking time (hydrophilicity) and wet/dry strength ratio, after the formulation had been cured, was noted. The results are indicated qualitatively with "plus" signs indicating improvement, (three "plus" signs is a very large improvement), and "minus" signs indicate a deterioration. A zero indicates no change.

The results are shown in Table 2 below.

TABLE 2

| Formulation | Additive | Am't[a] (grams) | Effect on water wicking time (cured) | Effect on W/D ratio at 200 kg/ metric ton[b] (cured) |
|---|---|---|---|---|
| 1 | Polyoxyethylene (6) sorbitol | 4 | ++ | o/+ |
| 2 | Polyoxyethylene (20) sorbitol | 4 | ++ | + |
| 3 | Glycerol | 4 | +++ | ++ |
| 4 | Polyethylene glycol (9) | 2 | o/+ | + |
| 5 | Polyethylene glycol (9) | 4 | +/++ | + |
| 6 | Methoxy polyethylene glycol 1900 | 2 | + | o |
| 7 | Methoxy polyethylene glycol 1900 | 4 | ++ | + |
| 8 | Polyethylene glycol (450)[c] (M.Wt. 20,000) | 4 | +++ | − |
| 9 | Polypropylene glycol 2025[d] | 2 | o/− | o |
| 10 | Dodecyl phenol/6 (ethylene oxide) condensate | 0.6 | − | o |
| 11 | Dodecyl phenol/6 (ethylene oxide) condensate | 1.0 | − | o |
| 12 | Nonyl phenol/9 (ethylene oxide) condensate | 0.7 | o/− | o |
| 13 | None (Control) | 0 | 0 | 0 |

[a]In each case the formulation comprised 25g of the air-curing polymer; 0.8g of a 40% actives solution of a sodium alkyl benzene sulfonate surfactant; 1.5g of a 5.0% aqueous cobaltous acetate tetrahydrate solution; the additive in the amount indicated below; and enough water to make the mixture up to 100g of a 25% actives emulsion.
[b]In nearly every instance where a positive change is noted the W/D ratio was about 0.5 or greater.
[c]The melting point of this additive exceeds 50° C.
[d]This additive is only partially water soluble.

Formulations 3, 5 and 8 were found to be the most stable against sediment formation as emulsion particles settled.

EXAMPLE 4

This example describes the effectiveness of glycerol when used in combination with a blend of air-curing polymer components.

The air curing polymer of Example 1 was air-sparged with stirring for a total of about 10.2 days at approximately 35° C. The product had a Gardner viscosity of N+.

10 Grams of the above air-built polymer were mixed with 40 grams of diallyl phthalate and 0.05 grams of cobaltic acetylacetonate and the mixture was air-sparged at room temperature. After 16.5 hours continuous sparging the Gardner viscosity at room temperature was Z-3. The solution was cooled and air sparging was stopped.

A 25% solids aqueous emulsion blend was formed by mixing 12.5 g of the blend with 0.2 g of a 40% slurry of sodium alkyl benzene sulfonate (a surfactant) adjusted to a pH of 5.5 using two drops of glacial acetic acid, 0.4 g of Triton X-305 (a non-ionic surfactant available under that trade name from Rohm & Haas Co.) and 36.27 g of deionized water.

A portion of this mixture was set aside for comparative purposes and a further portion was treated with 2% by weight of glycerol stirred into the emulsion. This blend was used to illustrate the invention.

Both the "comparative" resin blend and the "invention" blend were evaluated for wet and dry strength and for water wicking time by the techniques described above. The results are set forth in Table 3 below.

The function of the air-curing polymer from Example 1 was to initiate and accelerate the oxidative polymerization of the diallyl phthalate which would otherwise take a substantially longer time.

TABLE 3

| Resin | | Tensile Strength | | | Water Wicking Time |
|---|---|---|---|---|---|
| | | Wet gm/cm | Dry gm/cm | Wet/ Dry | |
| Comparative | Cross Direction | 3251 | 6590 | .493 | 68 |
| | Machine Direction | 3304 | 6680 | .495 | |
| Invention | Cross Direction | 3697 | 6090 | .607 | 5 |
| | Machine Direction | 3893 | 6287 | .619 | |
| (Waterleaf -no resin) | Cross Direction | 55.4 | 2018 | .027 | 1+ |
| | Machine Direction | 62.5 | 2090 | .030 | |

It will be noted that the "comparative" resin had insufficient surfactant to render the resin composition hydrophilic as the term is herein defined. Nevertheless when a mere 2% of glycerol was added the water wicking time was very greatly reduced to a level that indicates unequivocal hydrophilicity. Moreover the ratio of wet strength to dry strength is raised to above 0.6 by virtue of a slight increase in wet strength and a slight decrease in dry strength.

EXAMPLE 5

This example describes the effect of incorporating glycerol into a polymer formed by the oxidative polymerization of diallyl phthalate.

Diallyl phthalate (50 g) and cobaltic acetylacetonate (0.05 g) were air sparged at room temperature for 76 hours to effect air resinification. The product had a Gardner viscosity of Z-3 and was a viscous solution.

A sample of the polymer obtained (12.5 g) was mixed with 0.3 g of a 40% actives slurry of sodium alkyl benzene sulfonate (adjusting to pH 5.5 using 2 drops of glacial acetic acid), 0.6 g of Triton X-305 (a non-ionic surfactant available under that trade name from Rohm & Haas Co.), 0.4 g of a 5.0% aqueous solution of cobaltous acetate tetrahydrate, and 26.2 g of deionized water form an emulsion with 25% assay.

A portion of this emulsion was set aside for use as a comparison with the composition of the invention which was obtained by mixing into 50 g of the emulsion, 1.25 g of glycerol, (10% wt/wt. based on the polymer).

Both the formulations were evaluated for wet and dry tensile strength and water wicking time using the techniques described above. The results are set forth in Table 4.

TABLE 4

| Resin | | Tensile Strength | | Wet/ Dry | Water Wicking Time |
|---|---|---|---|---|---|
| | | Wet gm/cm | Dry gm/cm | | |
| Comparative | Cross Direction | 3286 | 6733 | .493 | 97 |
| | Machine Direction | 3376 | 6787 | | |
| Invention | Cross Direction | 3679 | 6108 | .611 | 14 |
| | Machine Direction | 3822 | 6215 | | |
| Waterleaf -no resin) | Cross Direction | 52 | 1965 | 0.028 | 1+ |
| | Machine Direction | 57 | 2054 | | |

As will be seen the same effect is observed when the air-curing polymer is obtained by the oxidative polymerization of a simple monomer containing two activated unsaturations.

The examples presented above illustrate the invention but do not imply any limitation on its scope. It is anticipated that many modifications or variations could be made without altering the basic concept of the invention and it is intended that all such modifications and variations be included within the purview of the invention.

What is claimed is:

1. A composition comprising a hydrophilic polymer comprising a plurality of unsaturated linkages that are activated towards oxidative polymerization and a polyol having at least two —OR groups where each R group is —H or —CH₃ provided that at least one such R group is hydrogen, and a carbon to oxygen atom ratio of less than 3:1.

2. A composition according to claim 1 in which the hydrophilic polymer has a backbone comprising at least one segment with the formula

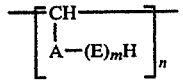

where A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either α, β or β γ to the activating group, n is the number of adjacent segments having this formula, and n and m are integers and are each at least 1, provided that where one is less than 4 the other is at least 4.

3. A composition according to claim 2 in which the hydrophilic polymer has the formula

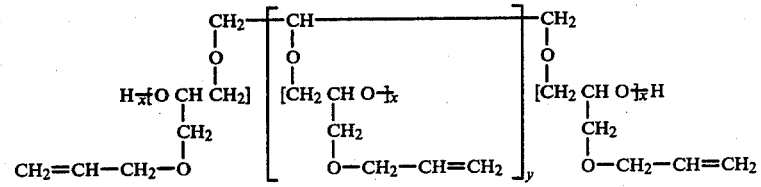

wherein y has a value from 0 to 4 and x is an integer from 4 to 6.

4. A composition according to claim 1 in which the hydrophilic polymer has been obtained by passing oxygen through a monomer maintained at a temperature of 30° C. or below, said monomer having a structure comprising at least two unsaturations, with no more than three of said unsaturations being adjacent in the molecule, at least one of said unsaturations being α, β or β, γ to a nucleophilic group capable of activating the unsaturation towards oxidative polymerization and selected from the group consisting of —O—, —S—, —CON<, —COO—, >C=C<, SO.OH<, —SO.O—, and >NCN, so as to polymerize the monomer oxidatively and raise the viscosity of the system to a desired level.

5. A composition according to claim 4 in which the hydrophilic polymer has been obtained by passing oxygen through a monomer maintained at a temperature of 30° C. or below, said monomer being selected from the group consisting of 1,2-diallyoxy-ethane; 1,4-diallyloxy-2-butene; 1,3-diallyloxy-2-propanol; diallyl sulfide; diallyl phthalate; β-vinyloxyethyl allyl ether; diallyl succinate, diallyl maleate, diallyl fumarate; triallyl cyanurate, triallyl orthoformate; dimethallyl malonate and bis (β-vinyloxyethyl) ether.

6. A composition according to any one of claims 2 to 5 in which the polyol has a melting point less than 50° C.

7. A composition according to any one of claims 2 to 5 in which the carbon to oxygen atomic ratio in the polyol is less than 1.5:1.

8. A composition according to any one of claims 2 to 5 in which the polyol is selected from the group consisting of glycerol; sorbitol; 1,2,4-butanetriol and triethylene glycol.

9. A composition according to any one of claims 2 to 5 which comprises from 1 to 50% by weight of the polyol.

10. A composition according to any one of claims 2 to 5 which comprises from 1 to 20% by weight of the polyol.

* * * * *